Aug. 8, 1933.  A. G. THOMAS  1,921,896
GAZING GLOBE
Filed Feb. 25, 1932  4 Sheets-Sheet 1

Inventor:
A. G. Thomas
Atty.

Aug. 8, 1933.  A. G. THOMAS  1,921,896
GAZING GLOBE
Filed Feb. 25, 1932  4 Sheets-Sheet 2

Inventor:
A. G. Thomas
by Geo. H. Evans
Att'y.

Aug. 8, 1933.  A. G. THOMAS  1,921,896
GAZING GLOBE
Filed Feb. 25, 1932    4 Sheets-Sheet 3

Inventor:
A. G. Thomas
by Geo. H. Evans
Att'y.

Aug. 8, 1933.  A. G. THOMAS  1,921,896
GAZING GLOBE
Filed Feb. 25, 1932  4 Sheets-Sheet 4
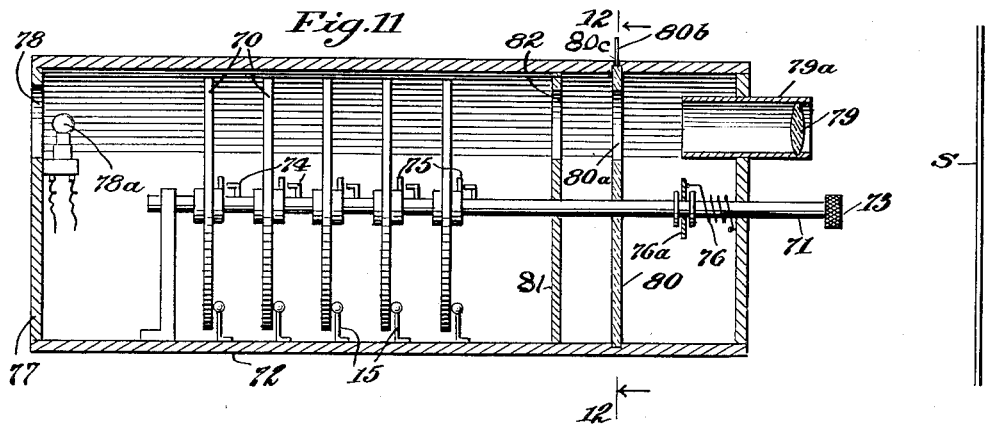
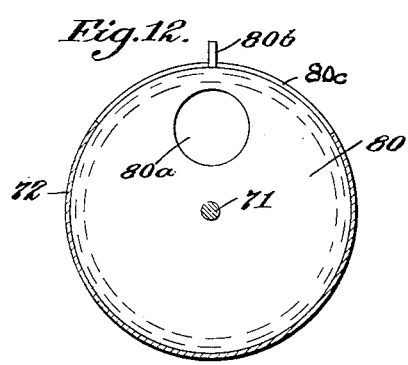
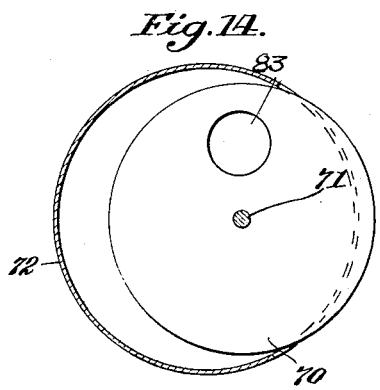
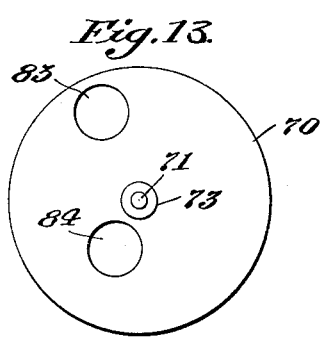
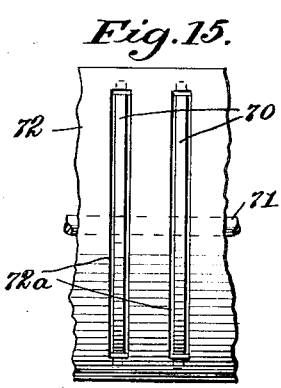
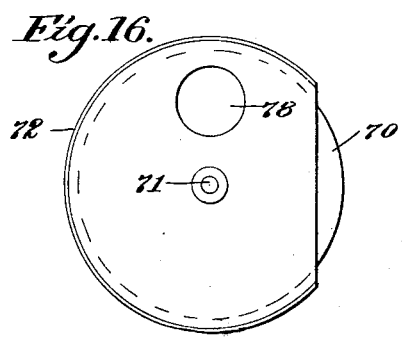
Inventor:
A. G. Thomas,
Att'y.

Patented Aug. 8, 1933

1,921,896

UNITED STATES PATENT OFFICE 1,921,896

GAZING GLOBE

Albert G. Thomas, Lynchburg, Va.

Application February 25, 1932. Serial No. 595,141

16 Claims. (Cl. 40—77)

My invention relates to amusement devices and has for an object to provide a device in which separate elements of a complete picture may be presented to the eye of an observer in such varied arrangement that the same complete picture will not be likely to be presented a second time. A further object is to provide means by which the change in the relative arrangement of the elements making up a complete picture may be affected quickly. A further object of my invention is to so arrange a series of discs each bearing the representation of an element of a complete picture, such as an eye, nose, or other feature of a face, that by imparting rotary motion to them and causing them to be brought individually to rest the face presented will be varied. A further object of my invention is to provide means for so mounting and rotating and stopping the discs bearing representations of elements that they will come to rest in such line that the representations of elements carried by them will be brought together in position to make a complete picture.

With the objects above indicated and other objects hereinafter explained, my invention consists in and comprises the construction and combination of elements hereinafter described and claimed.

Referring to the drawings.

Figure 7:
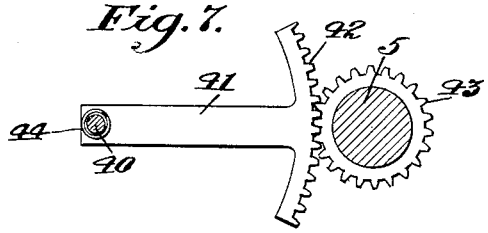
Figure 8:
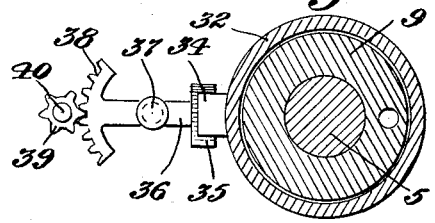

Figures 7 and 8 are detail views showing the disc impelling means illustrated in Figure 5, these views being taken from below respectively on lines 7—7 and 8—8 of Figure 5.

Figure 10:
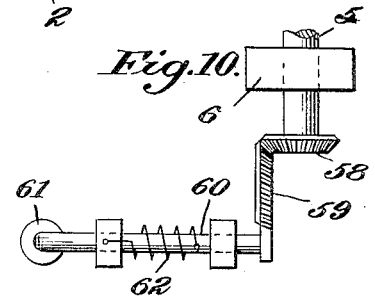
Figure 9:
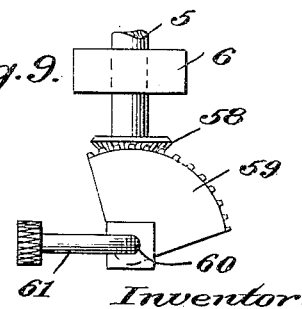

Figures 9 and 10 are detail views showing a modified form of impelling mechanism.

Figure 11 is a vertical longitudinal sectional view illustrating a form of my invention in which the picture discs are arranged to rotate on a horizontal axis.

Figure 12 is a view in cross section on line 12—12 of Figure 11.

Figure 13 is a face view of a disc having sets of pictures arranged on it at different distances from the centre.

Figure 14 is a cross sectional view of a modification in which the axis on which the picture carrying discs are mounted eccentrically with reference to the enclosing cylinder.

Figure 15 is a fragmentary side view of the enclosing cylinder for the discs shown in Figure 14, and Figure 16 shows a further modification.

Figure 1:
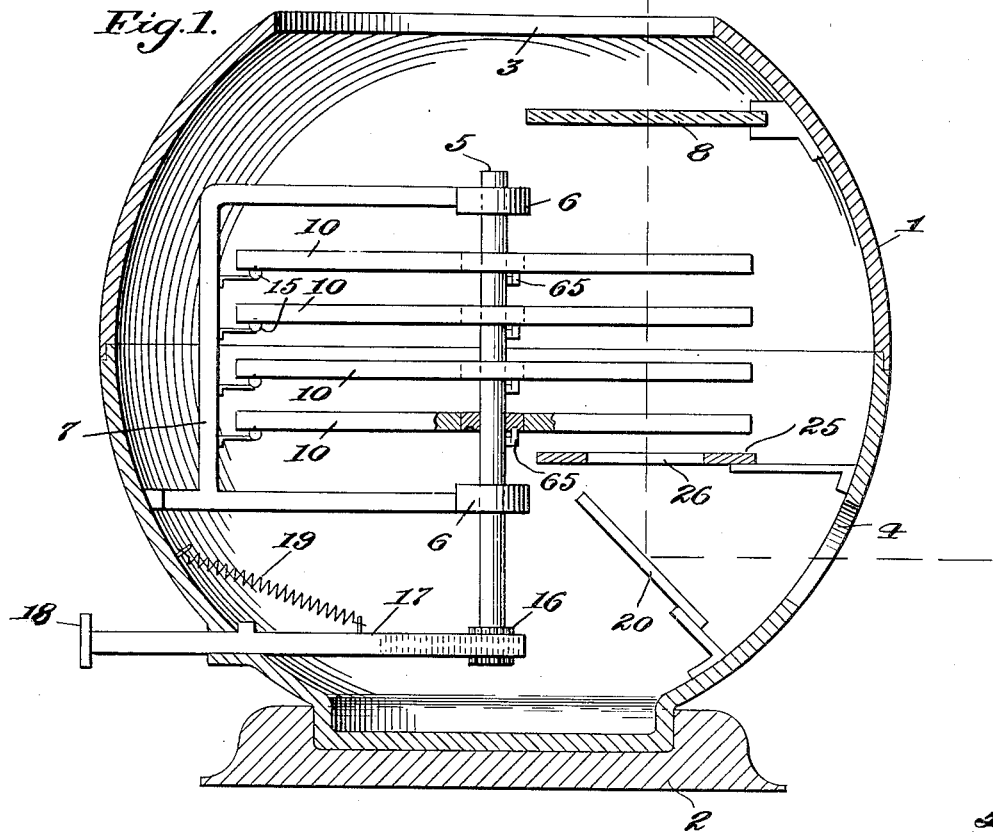
Figure 1 is a central vertical sectional view of one form of a device embodying my invention.
Figure 2:
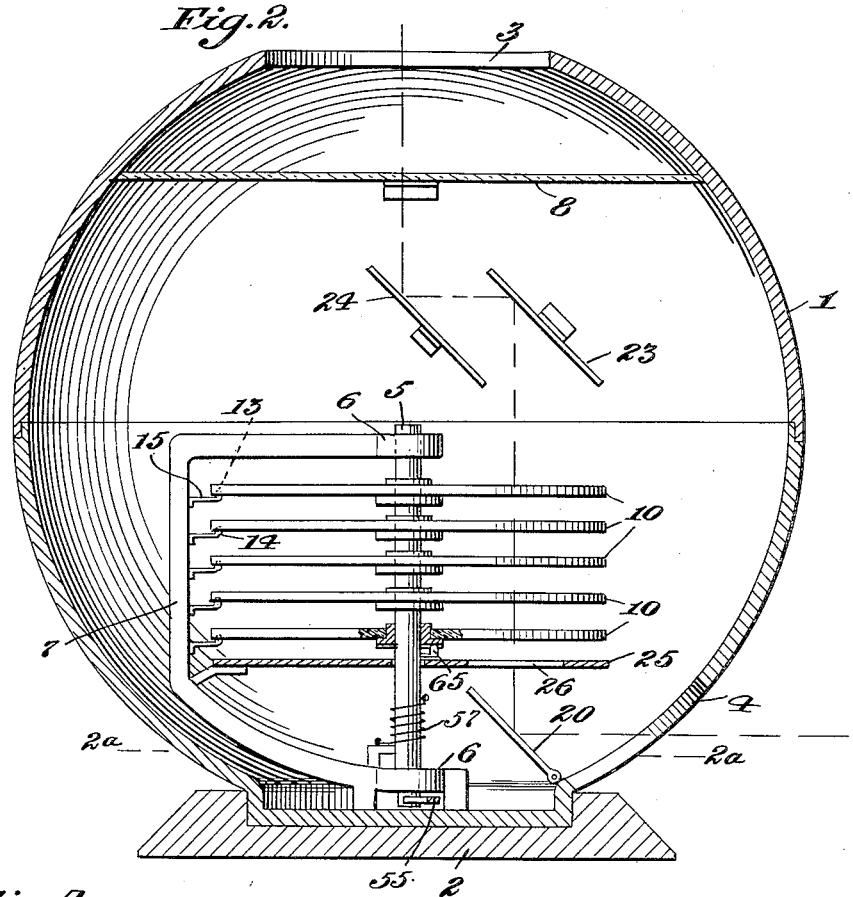
Figure 2 is a similar view of a modified form.

In the drawings 1 indicates an enclosing member preferably of globular shape and hereinafter referred to as the globe. This globe 1 is mounted on a base 2 and has in its upper end the sight or gazing opening 3 and as shown in Figures 1 and 2, has in one side near the base 2 an opening 4 for admitting light. The globe may be of any desired material such as clear glass, silvered or not, opaque or semi opaque glass, or may be of metal or other material. But whatever the material used it is desirable that the material be at least slightly opaque. The globe is preferably formed in two parts divided on a horizontal plane midway between its top and bottom.

Within the globe and supported in any convenient manner is a central vertical rotatable shaft 5. In the construction shown in Figures 1, and 2, this shaft is supported in bearings 6, 6, supported by a suitable framework 7 within the globe. In the construction shown in Figure 5 shaft 5 is supported at its lower end in a deep bearing 8 in the upper end of upright 9.

Figure 6:
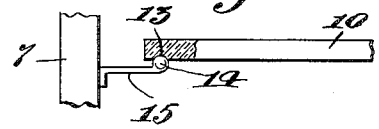
Figure 6 is a detail view showing means for braking and stopping a disc.

On shaft 5 are revolubly mounted a series of discs or plates 10 each provided with means adapted to be so engaged by cooperating means carried by the shaft that when shaft 5 is rotated in one direction it will cause the discs to rotate with it but when the shaft is rotated in the other direction it will not effect positive rotation of the discs and when brought to rest after being rotated in the direction necessary to effect rotation of the discs will leave each disc free to continue rotation by its momentum. The means carried by the discs may consist of notches 11 and the means carried by the vertical shaft may consist of pawls 12 as shown in Figure 5, but other means for the same purpose hereinafter described may be used. Discs 10 are of transparent or at least of translucent material and on each one of them is painted or otherwise produced on its surface a picture of a portion of a face or of a portion of the body of an animal or an element of some picture, the pictured elements on any particular disc being the same general element but specifically different and the pictured elements on the several discs being so related that when the pictured elements of the several elements are in line they will, taken together give the appearance of a complete face or a complete body or other complete thing. In order that the discs shall be in line when they come to rest after they have been given their initial rotation the discs may be provided as shown in Figures 2 and 6 at suitable intervals near their peripheries with depressions 13 adapted to receive balls 14 carried by spring arms 15 secured to frame work 7.

Shaft 5 may be caused to rotate by any convenient means. In Figure 1 the means shown for this comprises a pinion 16 at the lower end of shaft 5 and a sliding rack bar 17 having a push button 18 at its outer end and a retracting spring 19 secured at one end to the rack bar and at its other end to any convenient stationary portion of the globe or frame work 7. By pressing inward on push button 18 the shaft will be rotated in one direction without rotating discs 10 and on releasing the push button will be rotated in the other direction by the action of the retracting spring and will effect rotation of the discs. Other constructions of the means for giving shaft 5 its initial rotation are shown in Figures 2, 5 and 9, and 10 and will be hereinafter described.

In order that the complete picture formed by the fragmentary pictures on the several discs 10 may be visible through sight opening 3 it is necessary to direct a beam of light upward through portions of the discs which are in line so as to project the composite picture onto a suitable screen of ground glass or the like. In the construction shown in Figures 1 and 2, this beam of light which may be furnished by any convenient source, daylight or artificial light, enters through opening 4 and is deflected upward by mirror 20 arranged at an angle of about 45 degrees opposite opening 4 and below the lowermost of the discs 10. Above the uppermost disc 10, in the construction shown in Figure 1, and in line with mirror 20, is a ground glass plate 8 which is arranged to one side of the center of the globe and is visible through opening 3 and receives the composite picture from the several discs projected thereon upon the screen by the beam of light from opening 4 deflected upward by mirror 20. In the construction shown in Figure 5 screen 8 extends across opening 3 and between it and the uppermost of the discs 10 is arranged a prism 22 for the purpose of so deflecting the light beam that the complete picture will appear at or near the centre of opening 3 instead of at one side as in the construction shown in Figure 1. The same effect sought by the use of prism 22 may be secured by inclined mirrors 23 and 24 in Figure 2, the outer mirror 23 being arranged to deflect the image inward toward mirror 24 which is arranged to deflect the image upward onto screen 8. Instead of or combined with the prism may be an enlarging lens to enlarge images before they are thrown on the screen. In order to avoid including in the image too much of the portions of the discs surrounding the pictures, a plate 25 having an opening 26 in it concentric with the centre of the pictures carried by the discs 10 is arranged below the lowermost of the discs, or if preferred, may be above the plates.

The several discs 10 being each provided with the pictures of a single feature or other element of a complete picture adapted when brought into proper position with the pictures of other features or elements carried by the other discs to form a complete picture of a face or other picture made up of elements, the picture so formed will be visible through opening 3 on screen 8. As the specified form of the feature carried by a particular disc will be varied the complete picture shown on the screen will depend upon the position at which the discs are stopped by their brakes and a great variety of pictures of faces will be presented by starting the discs into rotation and bringing them to rest independently.

Figure 5:
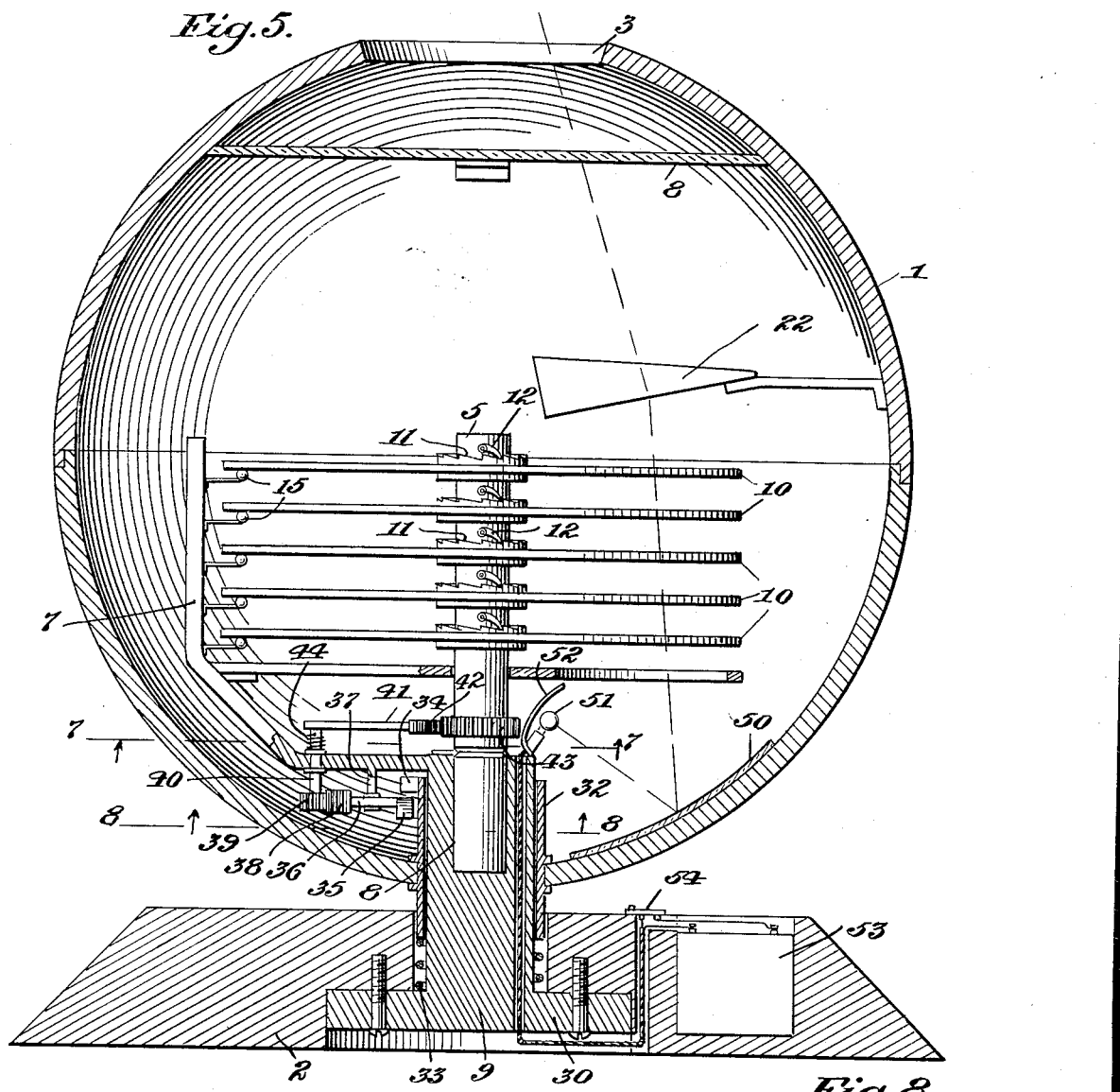
Figure 5 is a view similar to Figures 1 and 2, showing a modified form of the device.

In the construction shown in Figure 5 as above stated the lower end of vertical shaft 5 is supported and has its bearing in upright 9. This upright 9 extends upward through an opening in base 2 and is held in position by securing plate 30, which is, or may be, in one piece with upright 9, in a recess in the under side of base 2. Framework 7 is secured to upright 9. Globe 1 as shown in this Figure 5 is secured to a sleeve 32 which extends about an upright 9 and is yieldingly supported thereon by coiled spring 33.

Carried by sleeve 32 at its upper end is a laterally extending wedge 34 which is adapted to act upon a wedge 35 on the inner end of lever 36 which is pivoted at 37 on a pin extending downward from framework 7. On the outer end of lever 36 is a toothed segment 38 having its teeth in mesh with the teeth of pinion 39 on shaft 4 which extends through and has a bearing in framework 7. Rigid with shaft 40 is an arm 41 having at its inner end a toothed segment 42 with its teeth in mesh with the teeth of a gear 43 fast on vertical shaft 5. By pressing the globe downward against the resistance of spring 33 the wedge 34 is caused to act upon wedge 35 to cause lever 36 to cause its segment 38 to rotate pinion 39 and to cause segment 42 to act upon gear 43 to rotate shaft 5 without, however, rotating discs 10 as when shaft 5 is thus positively rotated pawls 12 slip over notches 11.

On releasing pressure on the globe and permitting it to be raised by spring 33 acting on sleeve 32 the wedge 34 will pass wedge 35 and, through return of spring 44 which is coiled about shaft 40 upon arm 41 will cause segment 42 to act upon gear 43 to rotate shaft 5. The discs in this construction are free to continue to rotate by their momentum, as in the construction shown in Figure 1, after shaft 5 has returned to initial position and each will be brought to rest by a ball 14 entering a depression 13. It will be understood that the spring arms 15 press balls 14 against the under, or upper, surfaces of the discs thus acting as brakes, the braking effect being increased by the resistance of the balls to being forced out of the depressions by the momentum of the discs. This braking action gradually overcomes the momentum and brings the discs to rest with a ball in the depression thus ensuring proper registry of the pictures on the several discs. As, however, the momentum of the discs will vary the discs will not be likely to bring the same picture on a particular disc a second time in line with the light beam. The ratchet notches of the discs may be varied and the tension of springs 15 may be varied.

Of course the positive movement of the actuating means may be utilized to impart rotation to the discs 10 in the several actuating devices shown, and the springs be used as returning or resetting devices.

Instead of having the globe provided with light opening 4 a portion 50 of the globe near base 2 may be silvered and an electric light bulb 51 may be arranged to throw a beam of light onto this silvered portion. For this purpose the electric light bulb may be supported on the upper end of upright 9 with a reflector 52 between the bulb and shaft 5. Reflectors 50 and 52 should be so designed that the upwardly traveling rays will be parallel. Current may be supplied from a battery located within base 2, as in recess 53, a switch 54 being provided at a suitable point for switching the light on or off.

Figure 2A:
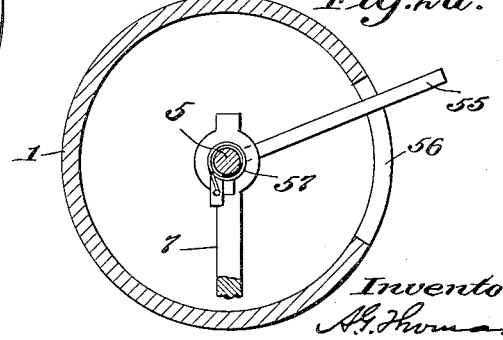
Figure 2a is a horizontal sectional view on line 2a—2a of Figure 2.

Instead of the means above described for imparting rotary movement to shaft 5 the construction shown in Figures 2 and 2a for this purpose may be used. This comprises a radially extending arm 55 secured to shaft 5 at its lower end and extending outward through slot 56 in the lower portion of globe 1. Movement of arm 55 through the arc permitted by the slot will rotate shaft 5 in one direction and on releasing the arm the shaft, with discs 10, will be rotated in the other direction by spring 57.

Another form of actuating means for shaft 5 is shown in Figures 9 and 10. In this construction shaft 5 is provided with bevel gear 58 with which meshes bevel segment 59 carried on one end of shaft 60, the other end being provided with crank 61. Spring 62 serves to return shaft 60 and through segment 59 and bevel gear 58 imparts rotation to shaft 5 and discs 10 on its release after being depressed.

Figure 3:
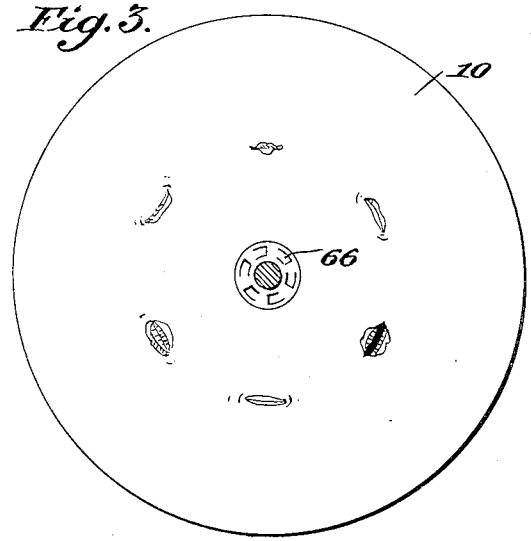
Figure 3 is a bottom plan view of one of the picture carrying discs.
Figure 4:
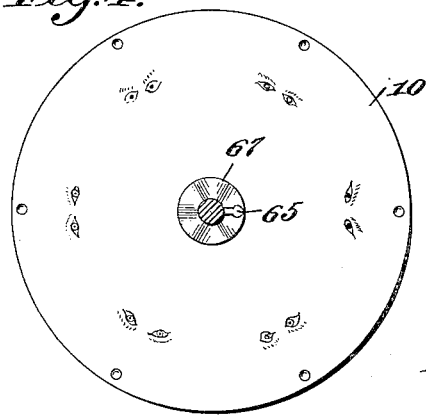
Figure 4 is a bottom plan view of another one of the discs.

Instead of ratchet 11 and pawl 12 for imparting rotation from shaft 5 to discs 10 the same effect may be produced by vertically extending pins 65 carried by shaft 5 engaging downwardly inclosed tongues 66 as shown in Figures 2 and 3, or by pins 65 engaging radially extending grooves 67 (see Figure 4) in the under faces of the discs, the grooves 67 serving also to align the pictures carried by the several discs.

In Figures 11 to 14 I have shown a modified form of the device of my invention in which discs 70 corresponding to discs 10 of Figures 1 to 5 are mounted to rotate on a horizontal shaft 71 within a horizontally arranged cylinder 72. For the purpose of effecting rotation of the discs 70 shaft 71 is provided on one end in the construction shown in Figure 11 with a knob 73 and is provided with pins 74 adapted to engage pins 75 on the discs. Shaft 71 is so mounted as to be capable of slight longitudinal movement against the resistance of spring 76 which is coiled about shaft 71 and serves to restore the shaft to its initial position after it has been pushed inward, the spring being secured at one end to the end of the casing and at the other end to a ring 76a on the shaft. In operation knob 73 and shaft 71 are pushed to the left carrying pins 74 into engagement with pins 75 and moving discs 70 slightly away from the brakes 15. Rotation of the shaft then spins the discs to the extent desired. On releasing knob 73 spring 76 returns shaft 71 to initial position releasing pins 74 from engagement with pins 75 and permitting the brakes 15 to act upon the discs.

The end 77 of cylinder 72 is provided with light opening 78 to admit daylight or artificial light. If preferred an electric light 78a may be placed within the end 77 as shown. At its other end the cylinder is provided with an opening 79 which may be provided with a tube 79a carrying a lens as shown. Within the cylinder a ground glass screen 80 is so placed to receive the picture that it may be seen through opening 79. Between ground glass screen and discs 70 is a diaphragm 81 having opening therein to define the picture.

Ground glass screen 80 is preferably so mounted in cylinder 72 as to be adapted to be rotated through a limited arc by means of pin 80b extending outward through slot 80c so as to bring opening 80a into or out of line with opening 82 in diaphragm 81 and with sight openings 79. When opening 80a is in line with sight opening 79 the image will be thrown through it and by adjusting tube 79a with its lens the image may be properly focussed on an exterior screen indicated at S.

In Figure 13 I have shown two rows of pictures at different radial distances from the centre, indicated by circles 83 and 84, on a single disc. This would of course, require two sight openings and two light beams.

In Figures 14 and 15 I have shown a combination in which the shaft 71 on which picture carrying discs 70 are mounted are arranged out of line with the axial centre of cylinder 72 so that a portion of each disc will project through a slot 72a in the side of the cylinder permitting the discs to be rotated by hand. The same result may be secured without arranging shaft 71 eccentrically by flattening cylinder 72 on one side and providing slots 72a in the flattened portion as shown in Figure 16.

By making the globe of Figures 1-5 of ground glass or of other slightly opaque translucent material suitable to have an image projected upon its inner surface visible from its exterior, screen 8 may be dispensed with.

It may be desirable to have the discs bear numerals to designate the different pictures carried by it.

It will, of course, be understood that I do not desire to be limited to the particular construction and arrangement of elements shown or described.

Having thus described my invention what I claim is:

1. In an amusement device a container formed of opaque material having a sight opening therein, a plurality of plates of translucent material rotatably mounted within the container, each bearing a representation of a portion of a pictorial figure, the representation on the several plates being such that when in register they will together form a complete pictorial figure, a ground glass screen between the plates and the sight opening in position to be visible through the sight opening, means for directing a beam of light through the plates toward the sight opening to project pictorial representations carried by the plates onto the screen, and means for imparting rotation to the plates.

2. In an amusement device a container formed of opaque material having a sight opening therein, a plurality of plates of translucent material rotatably mounted within the container, each bearing a representation of a portion of a pictorial figure, the representation on the several plates being such that when in register they will together form a complete pictorial figure, a ground glass screen between the plates and the sight opening in position to be visible through the sight opening, means for directing a beam of light through the plates toward the sight opening to project pictorial representations carried by the plates onto the screen, means for imparting rotation to the plates, and means for so stopping the rotation of the plates that the portions of pictorial figures on the several plates will be in register.

3. In an amusement device a container formed of opaque material having a sight opening therein, a plurality of plates of translucent material rotatably mounted within the container, each bearing a representation of a portion of a pictorial figure, the representation on the several plates being such that when in register they will together form a complete pictorial figure, a ground glass screen between the plates and the sight opening in position to be visible through the sight opening, means for directing a beam of light through the plates toward the sight opening to project pictorial representations carried by the plates onto the screen, means for imparting rotation to the plates, and means for so stopping the rotation of each of the plates independently that the portions of pictorial figures on the several plates will be in register.

4. In an amusement device a container formed of opaque material having a sight opening in its top, a plurality of plates of translucent material rotatably mounted on a vertical shaft within the container, each bearing a representation of a portion of a pictorial figure, the representation on the several plates being such that when in register they will together form a complete pictorial figure, ground glass screen above the plates in position to be visible through the sight opening, means below the plates for directing a beam of light upward to project pictorial representations carried by the plates onto the screen, means for imparting rotation to the plates and means for so stopping their rotation that the portions of pictorial figures on the several plates will be in register.

5. In an amusement device a container formed of opaque material having a sight opening in its top, a plurality of plates of translucent material rotatably mounted on a vertical shaft within the container, each bearing a represenation of a portion of a pictorial figure, the representation on the several plates being such that when in register they will together form a complete pictorial figure, a ground glass screen above the plates in position to be seen through the sight opening, means for directing a beam of light through the plates toward the ground glass screen to project thereon the pictorial representations carried by the plate, means for imparting rotation to the plates and separate means for so bringing each of the plates to rest that the portions of pictorial figures on the several plates will be in register.

6. In an amusement device a container formed of opaque material having a sight opening in its top, a plurality of plates of translucent material bearing pictorial representations rotatably mounted on a vertical shaft within the container, a ground glass screen between the plates and the sight opening in position to be seen through the sight opening, means for directing a beam of light through the plates toward the ground glass screen to project thereon the pictorial representations carried by the plates, means for deflecting the beam of light towards the centre of the sight opening, means for imparting rotation to the plates and means for bringing each of the plates to rest.

7. In an amusement device a container of opaque material having a sight opening in its top, a plurality of plates of translucent material bearing pictorial representations rotatably mounted within the container, a ground glass screen above the plates in position to be seen through the sight opening, means below the plates to one side of the centre of the container for directing a beam of light upward to project pictorial representations carried by the plates toward the top of the container, means between the plates and the screen adapted to so deflect the beam of light that the image carried by it will be projected onto the screen near the centre of the sight opening.

8. In an amusement device a container of opaque material having a sight opening in its top, a plurality of plates of translucent material bearing pictorial representations rotatably mounted within the container, a ground glass screen above the plates in position to be seen through the sight opening, means below the plates to one side of the centre of the container for directing a beam of light upward to project pictorial representations carried by the plates towards the top of the container, means comprising a prism between the plates and the screen adapted to so deflect the beam of light that the image carried by it will be projected onto the screen near the centre of the sight opening.

9. In an amusement device, a central shaft, a plurality of plates of translucent material carried by the shaft each carrying, equally spaced apart, varying representations of an element of a composite picture representations of other elements of which are carried by others of the plates, means for rotating the plates, means for so stopping the rotation of the plates that the representations of elements carried by the several plates will be in alignment, means for directing a beam of light through representations so aligned to project the complete picture formed by the aligned representations carried by the several plates onto a screen, and a screen arranged in position to receive the complete picture so projected and to present it visually.

10. In an amusement device, a central shaft, a plurality of plates of translucent material carried by and rotatable on the shaft each carrying, equally spaced apart, varying representations of an element of a composite picture representations of other elements of which are carried by others of the plates, means for rotating the shaft, means carried by the shaft for rotating the plates, means for so stopping the rotation of the plates that the represenations of elements carried by the several plates will be in alignment, means for directing a beam of light through representations so aligned to project the complete picture formed by the aligned representations carried by the several plates onto the screen, and a screen arranged in position to receive the complete picture so projected and to present it visually.

11. In an amusement device, a central shaft, a plurality of plates of translucent material carried by and rotatable on the shaft each carrying equally spaced apart varying representations of an element of a composite picture representations of other elements of which are carried by others of the plates, means for rotating the shaft in opposite directions, means carried by the shaft for engaging the plates to rotate them in one direction adapted to permit the shaft to rotate in the other direction without rotating the plates, means for stopping the rotation of the plates that the representations of elements carried by the several plates will be in alignment, means for directing a beam of light through representations so aligned to project the complete picture formed by the aligned representations carried by the several plates onto the screen, and a screen arranged in position to receive the complete picture so projected and to present it visually.

12. In an amusement device, a central shaft, a plurality of plates of translucent material carried by and rotatable on the shaft each carrying, equally spaced apart, varying representations of an element of a composite picture representations of other elements of which are carried by others of the plates, means for positively rotating the shaft in one direction, spring operated means for rotating the shaft in the return direction, means carried by the shaft for engaging the plates to rotate them on the return rotation of the shaft adapted to permit the shaft to rotate independently of the plates on its positively operated rotation, means for stopping the rotation of the plates that the representations of elements carried by the several plates will be in alignment, means for directing a beam of light through representations so aligned to project the complete picture formed by the aligned representations carried by the several plates onto the screen, and a screen arranged in position to receive the complete picture so projected and to present it visually.

13. In an amusement device, a central shaft, a plurality of plates of translucent material carried by and rotatable on the shaft each carrying, equally spaced apart, varying representations of an element of a composite picture representations of other elements of which are carried by others of the plates, means adapted to impart initial rotation to the plates and to permit them to continue to rotate by momentum, means for so stopping the rotation of the plates that the representations of elements carried by the several plates will be in alignment, means for directing a beam of light through representations so aligned to project the complete picture formed by the aligned representations carried by the several plates onto the screen, and a screen arranged in position to receive the complete picture so projected and to present it visually.

14. In an amusement device, a central shaft, a plurality of plates of translucent material carried by and rotatable on the shaft each carrying, equally spaced apart, varying representations of an element of a composite picture representations of other elements of which are carried by others of the plates, enclosing means of opaque material about the shaft and plates having a sight opening therein, means adapted to impart initial rotation to the plates and to permit them to continue to rotate by momentum, means for so stopping the rotation of the plates that the representations of elements carried by the several plates will be in alignment, means for directing a beam of light through the representations so aligned to project the complete picture formed by the aligned representations carried by the several plates onto the screen, and a screen arranged in position to receive the complete picture so projected and to present it visually.

15. In an amusement device, a central shaft, a plurality of plates of translucent material carried by and rotatable on the shaft each carrying, equally spaced apart, varying representations of an element of a composite picture representations of other elements of which are carried by others of the plates, a globe shaped container of opaque material enclosing the shaft and plates having a sight opening in its top, a screen within the globe above the plates, means adapted to impart initial rotation to the plates and to permit them to continue to rotate by momentum, means for so stopping the rotation of the plates that the representations of elements carried by the several plates will be in alignment, means within the globe for directing a beam of light through the representations so aligned to project the complete picture formed by the aligned representations carried by the several plates onto the screen, the screen being arranged in position to receive the complete picture so projected and to present it visually.

16. In an amusement device, a central shaft, a plurality of plates of translucent material carried by and rotatable on the shaft, each carrying, equally spaced apart, varying representations of an element of a composite picture representations of other elements of which are carried by others of the plates, a globe shaped container of opaque material enclosing the shaft and plates having a sight opening in its top, a screen within the globe above the plates, means adapted to impart initial rotation to the plates and to permit them to continue to rotate by momentum, means for so stopping the rotation of the plates that the representations of elements carried by the several plates will be in alignment, means within the globe to one side of the central shaft for directing a beam of light vertically through the representations so aligned to project the complete picture formed by the aligned representations carried by the several plates through deflecting means onto the screen, the screen being arranged in position to receive the complete picture so projected and to present it visually, and deflecting means between the plates and the screen adapted to deflect the beam of light laterally toward the centre and then upward onto the screen.

ALBERT G. THOMAS.